United States Patent
Minematsu

(10) Patent No.: US 8,189,770 B2
(45) Date of Patent: May 29, 2012

(54) TWEAKABLE BLOCK ENCRYPTION APPARATUS, METHOD, AND PROGRAM

(75) Inventor: Kazuhiko Minematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 481 days.

(21) Appl. No.: 12/310,040

(22) PCT Filed: Jul. 27, 2007

(86) PCT No.: PCT/JP2007/064749
§ 371 (c)(1),
(2), (4) Date: Feb. 9, 2009

(87) PCT Pub. No.: WO2008/012303
PCT Pub. Date: Feb. 14, 2008

(65) Prior Publication Data
US 2009/0196416 A1    Aug. 6, 2009

(30) Foreign Application Priority Data
Aug. 10, 2006    (JP) ................... 2006-218558

(51) Int. Cl.
*H04L 9/28* (2006.01)
(52) U.S. Cl. ............................. 380/28; 380/29
(58) Field of Classification Search ............... 380/26–29
See application file for complete search history.

(56) References Cited

U.S. PATENT DOCUMENTS

| | | | |
|---|---|---|---|
| 7,007,050 B2* | 2/2006 | Saarinen | 708/250 |
| 7,046,802 B2 | 5/2006 | Rogaway | |
| 7,200,227 B2 | 4/2007 | Rogaway | |
| 2004/0131182 A1* | 7/2004 | Rogaway | 380/37 |

FOREIGN PATENT DOCUMENTS
WO    WO 2004/023715 A1    3/2004

OTHER PUBLICATIONS

J. Daemen et al., "AES Proposal: Rijndael", 1998, Internet http://citeseerx.ist.psu.edu/viewdoc/summary?doi=10.1.1.36.640, pp. 1-22.*
L. Keliher et al., "Exact Maximum Expected Differential and Linear Probability for 2-round Advanced Encryption Standard", 2005, Internet http://citeseerx.ist.psu.edu/viewdoc/summary?doi=10.1.1.60.2047, pp. 1-9.*
S.Chow et al., "White-Box Cryptography and an AES Implementation", 2002, Internet http://citeseerx.ist.psu.edu/viewdoc/summary?doi=10.1.1.59.7710, pp. 1-18.*

(Continued)

*Primary Examiner* — Jung Kim
*Assistant Examiner* — Carlos M De Jesus, Jr.
(74) *Attorney, Agent, or Firm* — Foley & Lardner LLP

(57) ABSTRACT

The tweakable block cipher system and method also includes an offset calculation unit that calculates a sum of a value, which is generated by encrypting a constant plaintext using a block cipher, and the tweak and outputs a value which is generated by encrypting the result using a partial block cipher as an offset. Furthermore, an internal encryption unit calculates a sum of the offset and the plaintext, encrypts the sum using the block cipher, calculates a sum of the result and the offset, and outputs the sum as a ciphertext. In addition, the system and method includes an output unit that outputs the ciphertext.

12 Claims, 8 Drawing Sheets

OTHER PUBLICATIONS

K. Nyberg et al., "Provable Security Against a Differential Attack", 1995, Internet, http://citeseer.ist.psu.edu/viewdoc/summary?doi=10.1.1.34.1995, pp. 1-11.*

S. Chow et al., White-Box Cryptography and an AES Implementation, 2002, Internet, http://citeseerx.ist.psu.edu/viewdoc/summary?doi=10.1.1.59.7710, pp. 1-18.*

K. Nyberg et al., "Provable Security Against a Differential Attack", 1995, Internet, http://citeseer.ist.psu.edu/viewdoc/summary?doi=10.1.1.34.1995, pp. 1-11.*

J. Daemen et al., "AES Propsal: Rijndael", 1998, Internet, http://citeseerx.ist.psu.edu/viewdoc/summary?doi=10.1.1.36.640, pp. 1-22.*

Cristian Chitu, "AN FPGA implementation of the AES-Rijndael in OCB/ECB modes of operation", Feb. 2005, vol. 36, pp. 1-9.*

K. Nyberg et al., "Provable Security Against a Differential Attack", 1995, Internet, http://citeseer.ist.psu.edu/viewdoc/summary?doi=10.1.01. 34. 1995, pp. 1-11.*

J. Daemen et al., "AES Propsal: Rijndael", 1998, Internet, http://citeseerx.ist.psu.edu/viewdoc/summary?doi=10. 1. 1.36.640, pp. 1-22.*

Draft Proposal for Tweakable Narrow-block Encryption, Draft 1.00:00. [online]. 2004 [retrieved on Aug. 8, 2007]. Retrieved from the Internet: URL://siswg.04g/docs/>especially 5. The EME-32-AES transform, pp. 1-19.

D. Chakrabotty et al., "A New Mode of Encryption Providing a Tweakable Strong Pseudo-random Permutation," Lecture Notes in Computer Science, vol. 4047, pp. 293-309, Mar. 2006 especially 2 specification of PEP.

Draft Proposal for Tweakable Wide-block Encryption, Draft 1.00:00. [online]. 2004 [retrieved on Aug. 8, 2007]. Retrieved from the internet: <URL://http://siswg.org/docs/>especially 5. The EME-32-AES transform, pp. 1-18.

Efficient Instantiations of Tweakable Blockciphers and Refinements to Modes OCB and PMAC, Lecture Notes in Computer Science, vol. 3329, pp. 16-31, 2004 especially 3 The XE and XEX Constructions.

M. Lincov et al., "Tweakable Block Ciphers," Lecture Notes in Computer Science, vol. 2442, pp. 31-46, 2002, especially 3 Constructions.

S. Halevi et al., MMH: Software Message Authentication I the Gbit/second Rates, Mar. 1997, Fast Software Encryption, 4$^{th}$ International Workshop FSE, Lecture Notes in Computer Science, vol. 1267, pp. 1-16.

J. Daemen et al., AES Proposal: Rljndael, AES submission, 1998, Internet URL:http://csrc.nist.ciov/CryptoToolkit/aes/rijndael/Rijndael.pdf, pp. 1-22.

S. Park et al., "Improving the Upper Bond on the Maximum Differential and the Maximum Linear Hull Probability for SPN Structures and AES," International Workshop, FSE 2003, Lecture Notes in Computer Science; vol. 2887, pp. 1-14.

* cited by examiner

XEX MODE tweak=(tweak1, tweak2)

XE MODE tweak=(tweak1, tweak2)

PRIOR ART

TWEAKABLE BLOCK ENCRYPTION APPARATUS, METHOD, AND PROGRAM

TECHNICAL FIELD

Related Application

The present application claims priority from Japanese patent application 2006-218558 (filed on Aug. 10, 2006) the content of which is hereby incorporated in its entirety by reference into this application.

The present invention relates to a block cipher technology, and more particularly to a universal, fast tweakable block cipher apparatus, method, and program implemented by a combination of a block cipher and a part of the processing of a block cipher.

BACKGROUND ART

A tweakable block cipher refers to a block cipher that has an adjusting value called "tweak" in addition to input/output (plaintext, cipher text, and key) of a normal block cipher.

In a tweakable block cipher, it is required that, even if a tweak and an input are known to an attacker, the outputs of two block ciphers with different tweaks appear to the attacker the random values that are independent to each other. A tweakable block cipher is said to be secure when this requirement is satisfied.

Although some block ciphers that have an auxiliary input similar to a tweak have been proposed, the strict requirements for security have not been defined.

The formal definition of a tweakable block cipher was first established in Non-Patent Document 1.

In Non-Patent Document 1 shows that a theoretically secure tweakable block cipher may be obtained as a mode of operation of a normal block cipher (hereinafter abbreviated simply to "mode"), that is, as a conversion using a block cipher as a black box.

The theoretical security mentioned above means that the security of a tweakable block cipher, obtained as a mode of a block cipher, is ensured by the security of the underlying block cipher, that is, the security of the obtained tweakable block cipher is ensured as long as a secure block cipher is used.

In addition, two types of security definition are:

(I) Security required when an attacker can make a chosen plaintext attack (chosen-plaintext attack, called "CPA") only (II) Security required when an attacker can combine a chosen-plaintext attack and a chosen-ciphertext attack (chosen-ciphertext attack, called "CCA")

(I) is called "CPA-security" and (II) is called "CPA/CCA-security".

A secure tweakable block cipher is known as a key technology for implementing a sophisticated encryption function.

For example, Non-Patent Document 3 points out the following:

The use of a tweakable block cipher, which provides CPA/CCA-security, can implement a significantly efficient authenticated-encryption.

The use of a tweakable block cipher, which provides CPA-security, can implement an efficient, parallelable message authentication code.

It is also known that a tweakable block cipher, which provides CPA/CCA-security, is a technology required for a storage encryption such as a disk sector encryption.

In this specification, the mode proposed by Non-Patent Document 1 is called an "LRW mode". FIG. 7 is a diagram showing the LRW mode.

In the LRW mode, not only a block cipher but also a keyed function $f(K, *)$ is required.

When the security parameter assumes a value of e (e is greater than or equal to 0 and is less than or equal to 1), $f(K, *)$ has the property that, for any c, x, and x' (x and x' are different), the probability $Pr[f(K, x)+f(K, x')=c]$ is less than or equal to e.

In the description above, + represents the exclusive OR.

$f(K, *)$, which has this property, is said to be "e-almost XOR universal", or "e-AXU" for short.

An e-AXU function is a kind of universal hash functions. An e-AXU function can be implemented by a polynomial operation in the finite field or by the method proposed in Non-Patent Document 2.

They are several times faster than a general block cipher in a specific installation environment.

However, an e-AXU function, which can be implemented in any computer environment and is faster than a block cipher, is not known.

So, the problem is that an e-AXU function is efficient only in an environment where the e-AXU function can be installed for faster operation.

Another problem is that, because two parts—block cipher and e-AXU function—are installed, the program size is generally larger as when only a block cipher is used.

On the other hand, the XEX mode described in Non-Patent Document 3 is also known as a tweakable block cipher that uses only a block cipher. FIG. 8A shows the XEX mode (XEX construction).

In FIG. 8A, mu1 represents the multiplication operation * in the finite field where b is the base and tweak2 is the exponent.

That is, the offset is $$b^{\{tweak2\}}*E(K1, tweak1)$$

The advantage of this offset is that, when tweak2 is incremented, that is, when one is added to the immediately preceding value of tweak2, the computation can be carried out simply by one bit-shift operation and one exclusive OR operation of a constant.

That is, the offset calculation can be carried out much quicker than the encryption of a block cipher, with the result that the encryption of one block requires only the computation amount for encrypting about one block via a block cipher.

However, because a tweak at a particular point in time is generated only by incrementing the immediately preceding tweak, the XEX mode is applicable to the authenticated encryption but is not suitable for some applications such as the storage encryption.

The authenticated encryption, which uses a mode similar to the XEX mode, is described in Non-Patent Document 1 as the OCB mode. The authenticated encryption that uses the XEX mode itself is described in Non-Patent Document 3 as the OCB1 mode.

On the other hand, because the e-AXU function usually uses about the same amount of calculation for any input to generate the output, the LRW mode usually has not the restrictions involved in the XEX mode described above.

This problem can formally be solved by fixing tweak1 to a constant and treating only tweak2 as the tweak in FIG. 8(A). However, doing so, in turn, requires the computation amount of one block encryption for the offset calculation.

This means that the XEX mode in this case requires the computation amount, comparable to the computation amount of encrypting two blocks via a block cipher, for encrypting one-block.

Both the LRW mode and the XEX mode provide CPA/CCA-security. However, if the second exclusive OR operation via the offset is omitted in the LRW mode and the XEX mode, the obtained mode is a mode that provides CPA-security only.

Although CPA-security is weaker in the concept of security, it is known that CPA security is sufficient in several applications as described above.

In Non-Patent Document 3, the mode, in which the second exclusive OR operation via the offset is omitted in the XEX mode, is defined as the XE mode. FIG. 8B shows the XE mode (XE construction).

Non-Patent Document 1: Moses Liskov, Ronald L. Rivest, David Wagner: Tweakable Block Ciphers. Advanced in Cryptology—CRYPTO 2002, 22nd Annual International Cryptology Conference, Santa Barbara, Calif., USA, Aug. 18-22, 2002, Proceedings. Lecture Notes in Computer Science 2442 Springer 2002, pp. 31-46.

Non-Patent Document 2: S. Halevi and H. Krawczyk, MMH: Software Message Authentication in the G bit/second rates, Fast Software Encryption, 4th International Workshop, FSE '97, Lecture Notes in Computer Science; Vol. 1267, Feb. 1997

Non-Patent Document 3: Phillip Rogaway: Efficient Instantiations of Tweakable Blockciphers and Refinements to Modes OCB and PMAC. Advances in Cryptology—ASIACRYPT 2004, 10th International Conference on the Theory and Application of Cryptology and Information Security, Jeju Island, Korea, Dec. 5-9, 2004, Proceedings. Lecture Notes in Computer Science 3329 Springer 2004, pp. 16-31

Non-Patent Document 4: J. Daemen and V. Rijmen, AES Proposal: Rijndael, AES submission, 1998. Internet<URL: http://csrc.nist.gov/CryptoToolkit/aes/rijndael/Rijndael.pdf>

Non-Patent Document 5: S. Park, S. H. Sung, S. Lee, and J. Lim, Improving the Upper Bound on the Maximum Differential and the Maximum Linear Hull Probability for SPN Structure and AES, International Workshop, FSE 2003, Lecture Notes in Computer Science; Vol. 2887, Feb. 2003

Patent Document 1: U.S. Pat. No. 7,046,802 Specification

The disclosures of Non-Patent Documents 1-5 and Patent Document 1 given above are hereby incorporated in their entirety into this specification.

The methods described above have the following problems (according to the result of analysis made by the inventor).

The conventional XEX mode and XE mode, which perform tweakable block ciphers using only a block cipher, have one of the following problems.

The computation amount of one-block encryption is required for updating a tweak.

A tweak can be update only incrementally.

In addition, the installation environment of the LRW mode that combines a block cipher and the e-AXU function is limited. This is because an e-AXU function that runs fast in all environments is not known. Even if there is an environment in which the mode can be installed, the program size becomes large because both a block cipher and the e-AXU function are installed.

Accordingly, it is an object of the present invention to provide a tweakable block cipher apparatus, method, and program that combine a block cipher with a part of the block cipher to make it possible to update a tweak in any desired way with the amount of computation smaller than that required for one-block encryption and, at the same time, ensure efficiency in the memory amount used for pre-processing and provide theoretical security.

The invention disclosed by this application generally has the following construction.

A first tweakable block cipher apparatus of the present invention comprises input means that receives a pair of a plaintext and a tweak; offset calculation means that calculates a sum of a value, which is generated by encrypting a fixed plaintext using a block cipher, and the tweak and encrypts the result using a partial block cipher to output an offset; internal encryption means that calculates a sum of the offset and the plaintext, encrypts the sum using the block cipher, calculates a sum of the result and the offset, and outputs the sum as a ciphertext; and output means that outputs the ciphertext.

A second tweakable block cipher apparatus of the present invention comprises input means that receives a pair of a plaintext and a tweak; offset calculation means that calculates a sum of a value, which is generated by encrypting a fixed plaintext using a block cipher, and the tweak and encrypts the result using a partial block cipher to output an offset; internal encryption means that calculates a sum of the offset and the plaintext, encrypts the sum using the block cipher, and outputs the encrypted sum as a ciphertext; and output means that outputs the ciphertext.

A third tweakable block cipher apparatus of the present invention is the first or second tweakable block cipher apparatus wherein the block cipher used by the internal encryption means and the offset calculation means is AES (Advanced Encryption Standard) and the partial block cipher used by the offset calculation means is an iteration of four rounds of a round function of AES.

A fourth tweakable block cipher apparatus of the present invention is the first or second tweakable block cipher apparatus wherein the block cipher and processing using a round function of the block cipher are used.

A first program of the present invention causes a computer, which configures a tweakable block cipher apparatus, to execute:

input processing that receives a pair of a plaintext and a tweak from an input device;

offset calculation processing that calculates a sum of a value, which is generated by encrypting a predetermined fixed plaintext using a block cipher, and the tweak and encrypts the result using a partial block cipher to output an offset;

internal encryption processing that calculates a sum of the offset and the plaintext, encrypts the sum using the block cipher, calculates a sum of the result and the offset, and outputs the sum as a ciphertext; and output processing that outputs the ciphertext from an output device.

A second program of the present invention causes a computer, which configures a tweakable block cipher apparatus, to execute:

input processing that receives a pair of a plaintext and a tweak from an input device;

offset calculation processing that calculates a sum of a value, which is generated by encrypting a fixed plaintext using a block cipher, and the tweak and encrypts the result using a partial block cipher to output an offset;

internal encryption processing that calculates a sum of the offset and the plaintext, encrypts the sum using the block cipher, and outputs the encrypted sum as a ciphertext; and output processing that outputs the ciphertext from an output device.

In a third program of the present invention, the block cipher used by the internal encryption processing and the offset calculation processing is AES and the partial block cipher used by the offset calculation processing is an iteration of four rounds of a round function of AES.

In a fourth program of the present invention, the block cipher and processing using a round function of the block cipher are used.

A first method of the present invention is a tweakable block cipher method executed by a computer, comprising:

an input step of receiving a pair of a plaintext and a tweak from an input device;

an offset calculation step of calculating a sum of a value, which is generated by encrypting a predetermined fixed plaintext using a block cipher, and the tweak and encrypting the result using a partial block cipher to output an offset;

an internal encryption step of calculating a sum of the offset and the plaintext, encrypting the sum using the block cipher, calculating a sum of the result and the offset, and outputting the sum as a ciphertext; and an output step of outputting the ciphertext from an output device.

A second method of the present invention is a tweakable block cipher method executed by a computer, comprising:

an input step of receiving a pair of a plaintext and a tweak from an input device;

an offset calculation step of calculating a sum of a value, which is generated by encrypting a fixed plaintext using a block cipher, and the tweak and encrypting the result using a partial block cipher to output an offset;

an internal encryption step of calculating a sum of the offset and the plaintext, encrypting the sum using the block cipher, and outputting the encrypted sum as a ciphertext; and an output step of outputting the ciphertext from an output device.

In a third method of the present invention, the block cipher used by the internal encryption step and the offset calculation step is AES and the partial block cipher used by the offset calculation step is an iteration of four rounds of a round function of AES.

In a fourth method of the present invention, the block cipher and processing using a round function of the block cipher are used.

A fifth tweakable block cipher apparatus of the present invention comprises input means that receives a pair of a plaintext and a tweak; offset calculation means that calculates a sum of a value, which is generated by encrypting a fixed plaintext using a block cipher, and the tweak and encrypts the result using a partial block cipher to output an offset; internal encryption means that determines whether a result, which is generated by encrypting a sum of the offset and the plaintext using the block cipher, is output as a ciphertext or a sum of a result, which is generated by the encryption using the block cipher, and the offset is output as a ciphertext according to a value of the tweak.

A fifth program of the present invention causes a computer, which configures a tweakable block cipher apparatus, to execute:

input processing that receives a pair of a plaintext and a tweak from an input device;

offset calculation processing that calculates a sum of a value, which is generated by encrypting a predetermined fixed plaintext using a block cipher, and the tweak and encrypts the result using a partial block cipher to output an offset;

internal encryption processing that determines whether a result, which is generated by encrypting a sum of the offset and the plaintext using the block cipher, is output as a ciphertext or a sum of a result, which is generated by the encryption using the block cipher, and the offset is output as a ciphertext according to a value of the tweak; and output processing that outputs the ciphertext from an output device.

A fifth method of the present invention is a tweakable block cipher method executed by a computer, comprising:

an input step of receiving a pair of a plaintext and a tweak from an input device;

an offset calculation step of calculating a sum of a value, which is generated by encrypting a fixed plaintext using a block cipher, and the tweak and encrypting the result using a partial block cipher to output an offset;

internal encryption step of determining whether a result, which is generated by encrypting a sum of the offset and the plaintext using the block cipher, is output as a ciphertext or a sum of a result, which is generated by the encryption using the block cipher, and the offset is output as a ciphertext according to a value of the tweak; and an output step of outputting the ciphertext from an output device.

A first effect of the present invention is that the program size is smaller than that of the LRW mode in which a generally-known algebraic e-AXU function is used.

The reason is that, in the present invention, a part of a block cipher is combined with the block cipher itself instead of using the e-AXU function required in the LRW mode. The other operations required in the present invention are only very simple functions such as an exclusive OR. Therefore, the present invention may substantially be implemented by a block cipher only.

A second effect of the present invention is that a tweak, which may be updated only in a limited way in the XEX mode, may be updated speedily in any desired way.

The reason is that the present invention is configured such that only a part of the block cipher processing is required for updating a tweak and calculating a new offset. The present invention allows a constant plaintext, which must also be encrypted, to be calculated in advance and stored in the memory, thus eliminating the need for the calculation when the tweak is updated.

A third effect of the present invention is that, when the present invention is applied to a known block cipher, the theoretical security comparable to that of the conventional mode can be provided depending upon a part of a block cipher that is used.

The reason is that it can be proved that the present invention provides theoretical security when the maximum average of differential probability of a part of a block cipher used in the present invention and some kind of differential probability related to it are sufficiently low.

PREFERRED MODES FOR CARRYING OUT THE INVENTION

The invention described above will be described more in detail with reference to the attached drawings. The present invention configures a tweakable block cipher by combining block-basis processing, derived from a part of a block cipher, with the block cipher itself. The former processing is typically performed by using a reduced-round version of a block cipher, that is, by using a substitution through several iterations of a round function. This substitution processing and the block cipher itself are combined to configure a fast tweakable block cipher that makes possible any update of a tweak that is impossible in the XEX mode.

When the substitution processing derived from a part of a block cipher is used, a sum of a tweak and the output of a block cipher, which receives a constant plaintext as its input, is calculated and the resulting sum is supplied to the substitution processing to generate an intermediate variable called an offset.

A tweakable block cipher is obtained by adding this offset to the input and the output of a normal block cipher and performing the encryption. When the block cipher is secure and when several types of differential probability of the substitution processing derived from a part of the block cipher are small, this method provides a tweakable block cipher theoretically secure against a chosen plaintext/ciphertext attack.

Figure 1:
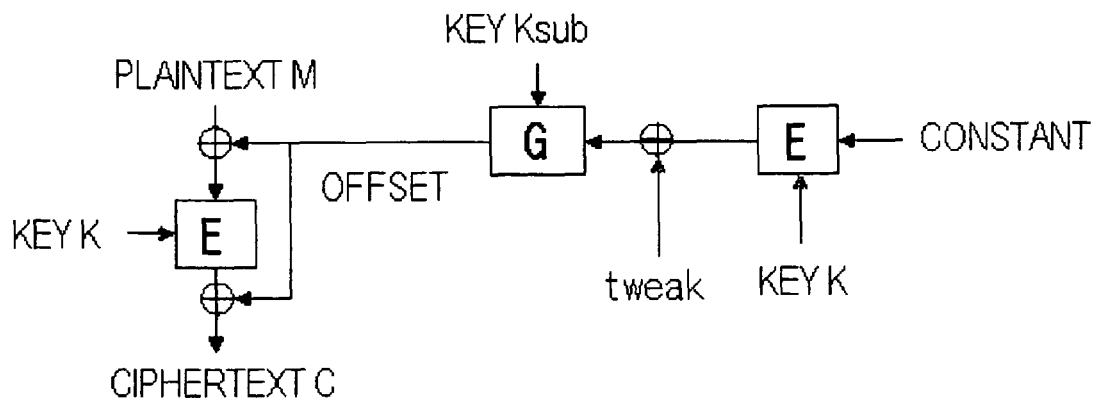
FIG. 1 is a diagram showing the construction of a first exemplary embodiment of the present invention.

FIG. 1 is a diagram showing the construction of one embodiment of the present invention. Referring to FIG. 1, a fixed plaintext (constant) is encrypted by a block cipher E (where, K is the key of E), the sum of the encrypted result and a tweak is calculated, the result is encrypted using a partial block cipher G (Ksub is the key of G) to calculate an offset, the sum of this offset and the plaintext M is calculated and the sum is encrypted using the block cipher E, and the sum of the result and the offset is output as a ciphertext C. The partial block cipher G is a part of the block cipher E.

Figure 4:
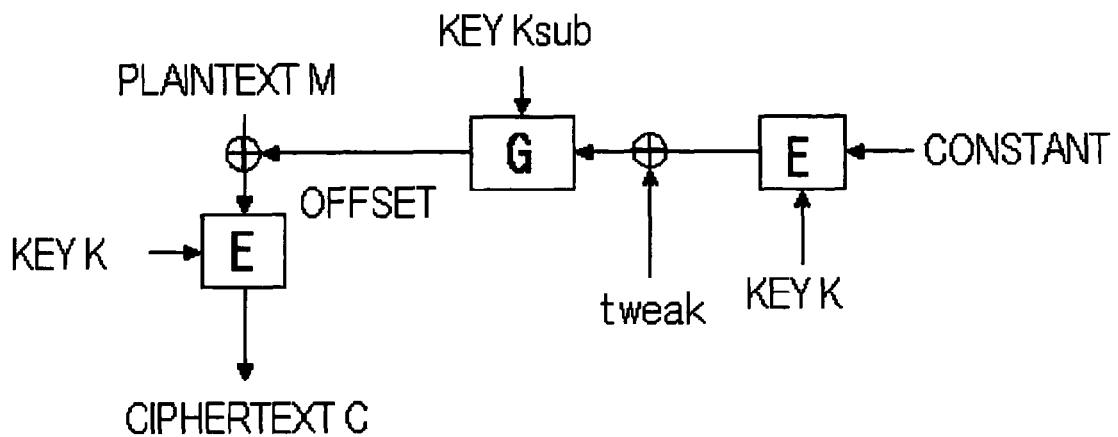
FIG. 4 is a diagram showing the construction of a second exemplary embodiment of the present invention.

In a second embodiment of the present invention, the sum of the offset and the plaintext M is calculated, the sum is encrypted using the block cipher E, and the result is output as the ciphertext C, as shown in FIG. 4. If the addition of the offset to the output of the block cipher is omitted in the present invention, the result is a tweakable block cipher that is secure against a chosen-plaintext attack.

Figure 9:
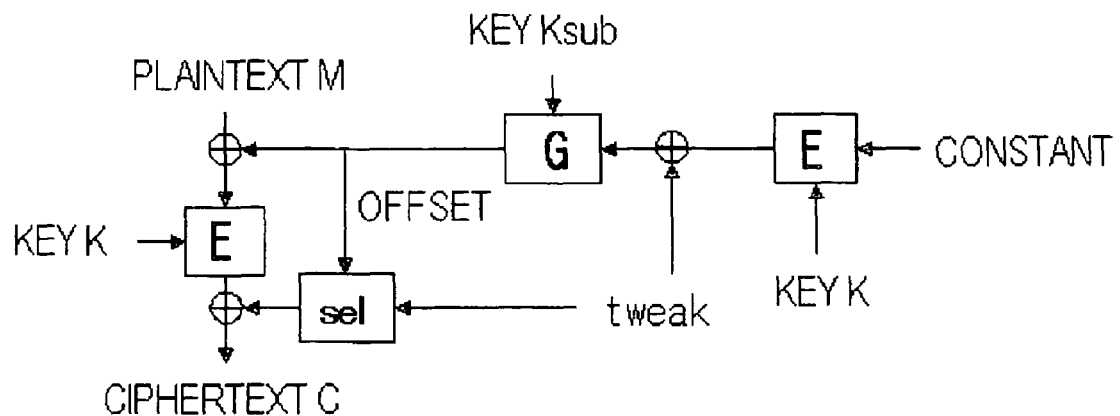
FIG. 9 is a diagram showing the construction of a third embodiment of the present invention.

In a third embodiment of the present invention, the sum of the offset and the plaintext M is calculated, the result is encrypted using the block cipher E, and whether the result is output is as the ciphertext C or the sum of the result and the offset is output as the ciphertext C is selected according to the value of the tweak, as shown in FIG. 9. In this present invention, if the addition of the offset to the output of the block cipher is omitted for the value of a tweak, the result is a tweakable block cipher that is secure against a chosen-plaintext attack for the tweak and is tweakable block cipher that is secure against a chosen-plaintext/ciphertext attack for other tweaks.

When AES is used for the block cipher and the reduced-round version of four rounds of AES is used for a part of the processing, the present invention requires 14 rounds of the round function of AES for encrypting one block. On the other hand, though a mode in which the tweak can be updated in any desired way and only the block cipher is used is available as a variation of the XEX mode, this variation requires 20 rounds of the round function of AES for encrypting one block. This means that the method of the present invention is 1.4 times faster. The following describes the present invention with reference to the embodiments.

EXEMPLARY EMBODIMENTS

Figure 2:
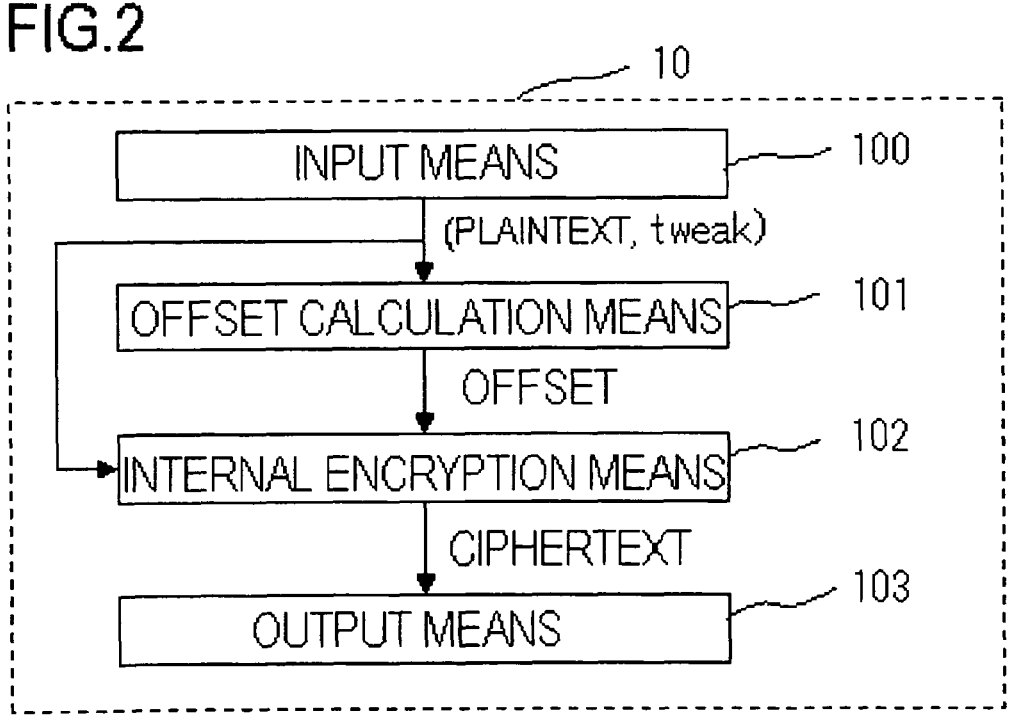
FIG. 2 is a diagram showing the device construction of the first exemplary embodiment of the present invention.

FIG. 2 is a block diagram showing the device construction of a tweakable block cipher apparatus in a first exemplary embodiment of the present invention.

Referring to FIG. 2, a tweakable block cipher apparatus 10 in this exemplary embodiment comprises input unit 100, offset calculation unit 101, internal encryption unit 102, and output unit 103. The tweakable block cipher apparatus 10 may be implemented by an information processing device that has a CPU, a memory, and a disk device which are not shown. The units of the tweakable block cipher apparatus 10 can be implemented by storing programs in a storage device or a storage medium and loading the programs into the main storage for running on the CPU.

The following describes the means configuring the tweakable block cipher apparatus 10.

The input unit 100 is a unit for receiving a plaintext to be encrypted and a tweak. This unit is implemented by a character input device such as a keyboard.

The offset calculation unit 101 is a unit for calculating the offset value "offset" that depends on a tweak. The offset calculation unit 101 carries out the calculation of expression (1) given below. When the block size is n bits, the tweak is also n bits, and this processing is the processing of a keyed function that receives n bits as the input and outputs n bits.

$$\text{offset} = G(\text{Ksub}, E(K, \text{const}) + \text{tweak}) \quad (1)$$

In expression (1) given above,
+ is an exclusive OR,
E is the block cipher of an n-bit block,
K is the key of E, and
const is the value of an arbitrary n-bit constant.

G in expression (1) given above is a part of E and is a keyed n-bit function or an n-bit substitution that takes a key as the first argument, and an input as the second argument, of G. For example, when E has a construction in which a round function is iterated r times, G iterates the same round function s times where s is an integer less than or equal to r (in this case, G is called a "reduced-round version" of a block cipher). Note that K and Ksub are independent to each other. Their lengths are not necessarily the same. In addition, Ksub may be a constant.

E(K, const) in expression (1) may be calculated and stored in advance.

There are three conditions for G.

One of the conditions is that the maximum average of differential probability of G(Ksub, *) in expression (2) given below
is sufficiently small or
is estimated reliably that it is sufficiently small.

$$\max\{Pr(G(\text{Ksub}, X) + G(\text{Ksub}, X+a) = b)\} \quad (2)$$

Note that, in expression (2), the maximum value (max) is calculated for all non-zero a and all b (including zero). The probability space is defined by the key Ksub and X that is an n-bit uniform random number. If the key Ksub is fixed to the constant c, then the probability space is defined only by X.

The other two conditions are that, for the values of expression (3) and expression (4) given below, it is required that the value be sufficiently small or that it be estimated reliably that the value is sufficiently small.

$$\max\{Pr(G(Ksub,X)=b)\} \quad (3)$$

$$\max\{Pr(G(Ksub,X)+X=b)\} \quad (4)$$

Note that, in expression (3) and expression (4), the maximum value (max) is calculated for all b (including zero). The probability space is defined by the key Ksub and X that is an n-bit uniform random number. If the key Ksub is fixed to the constant c, then the probability space is defined only by X.

To provide invulnerability to a differential attack and a linear attack, a block cipher is recently designed in many cases in such a way that, when G is an iteration of several rounds of the round function, the maximum average of differential probability and the maximum average of linear probability shown in expression (2) are made smaller.

In some block ciphers, the maximum average of differential probability and the maximum average of linear probability are actually proved to be small. For example, Non-Patent Document 5 shows that the maximum differential probability for four rounds of iteration of the block cipher AES in Non-Patent Document 4 is $2^{113}$ at the highest.

In addition, because
the probability of expression (3) has the theoretical minimum value ($2^{-n}$ when the block size is n) if G is a substitution and
it is expected that an appropriate number of iterations of the round function of a block cipher, which has invulnerability to a linear attack, produces a sufficiently small value because the probability, shown in FIG. (4), is related to the linear probability,
using the reduced-round version of a secure block cipher as G allows the embodiment of the present invention to be constructed with high reliability in security.

The internal encryption unit 102 is a unit for generating a ciphertext using the offset value, output by the offset calculation unit 101, and the plaintext. When the plaintext is M and the offset value output by the offset calculation unit 101 is "offset", the ciphertext output by the internal encryption unit 102 is given by the following expression (5).

$$E(K,M+\text{offset})+\text{offset} \quad (5)$$

where
E is a block cipher,
K is the key of E and
+ is an exclusive OR.

The output unit 103 is a unit for outputting the ciphertext, which is output by the internal encryption unit 102, to the computer display or the printer.

The operation of the first exemplary embodiment of the present invention will now be described in detail with reference to the flowcharts in FIG. 2 and FIG. 3.

Figure 3:
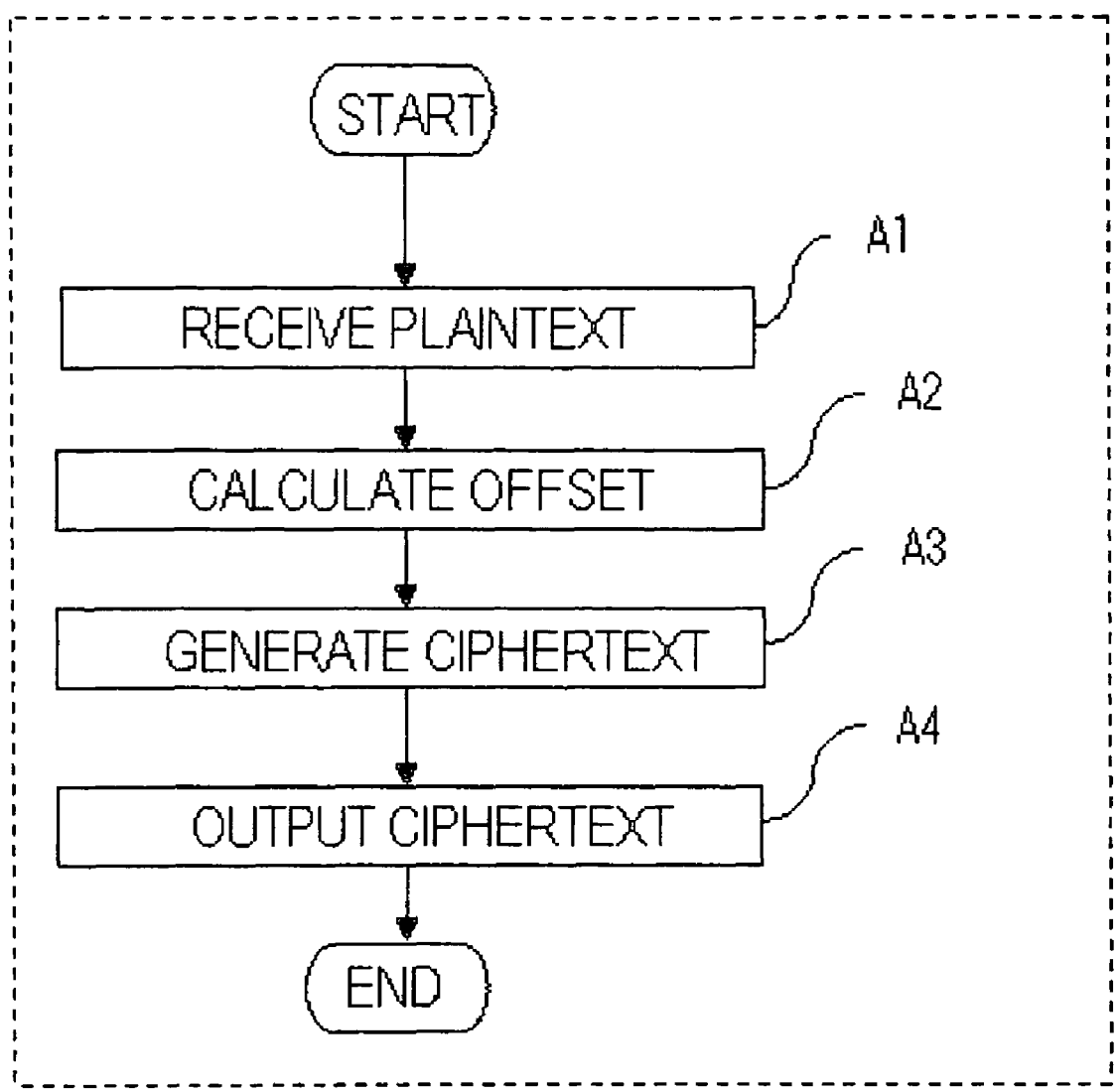
FIG. 3 is a flowchart showing the operation of the first exemplary embodiment of the present invention.

First, a plaintext and a tweak are input to the input means 100 (step A1 in FIG. 3), and the offset calculation means 101 uses the tweak to calculate the offset according to expression (1) (step A2 in FIG. 3).

Next, using the offset, which is output by the offset calculation means 101, and the plaintext, the internal encryption means 102 generates a ciphertext (step A3 in FIG. 3).

Finally, the ciphertext is output (step A4 in FIG. 3).

Figure 5:
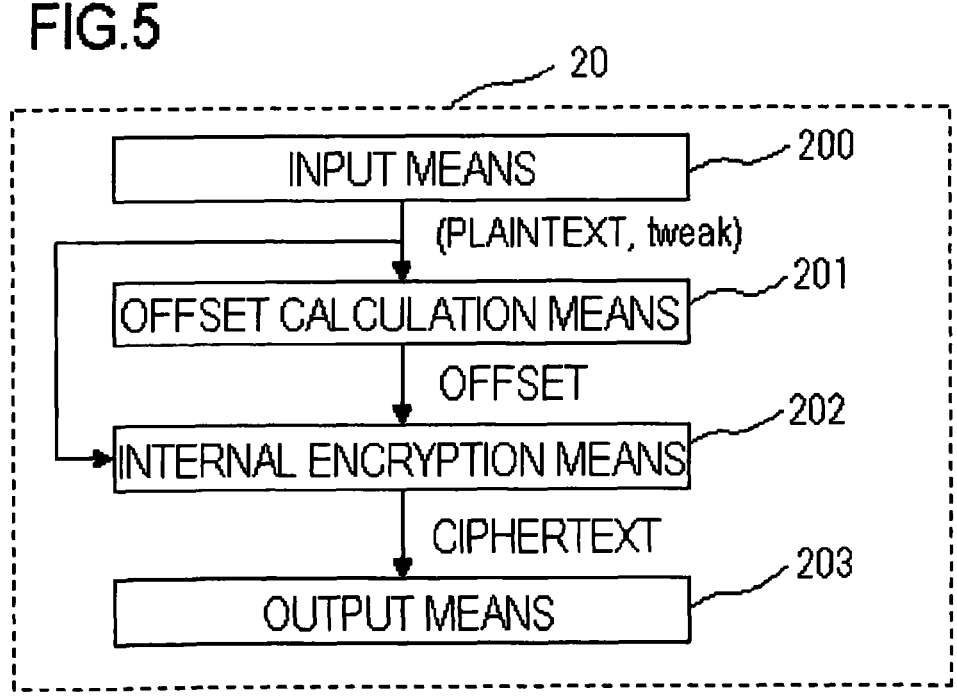
FIG. 5 is a diagram showing the device construction of the second exemplary embodiment of the present invention.

Next, a second exemplary embodiment of the present invention will be described. FIG. 5 is a block diagram showing the construction of a tweakable block cipher apparatus in the second exemplary embodiment of the present invention.

A tweakable block cipher apparatus 20 in this exemplary embodiment comprises input unit 200, offset calculation unit 201, internal encryption unit 202, and output unit 203. As in the first exemplary embodiment shown in FIG. 2, the tweakable block cipher apparatus 20 may be implemented by an information processing device that has a CPU, a memory, and a disk device which are not shown. The units of the tweakable block cipher apparatus 20 can be implemented by storing programs in a storage device or a storage medium and loading the programs into the main storage for running on the CPU.

The input means 200, offset calculation means 201, and output means 203 are the same as the input means 100, offset calculation means 101, and output means 103 in the first exemplary embodiment.

The internal encryption unit 202 is a unit for generating a ciphertext using an offset value, which is output by the offset calculation unit 201, and a plaintext. When the plaintext is M and the offset value output by the offset calculation unit 201 is "offset", the ciphertext output by the internal encryption unit 202 is given by expression (6) shown below.

$$E(K,M+\text{offset}) \quad (6)$$

where
E is a block cipher,
K is the key of E, and
+ is an exclusive OR.

The general operation of the second exemplary embodiment of the present invention will now be described in detail with reference to the flowcharts in FIG. 5 and FIG. 6.

Figure 6:
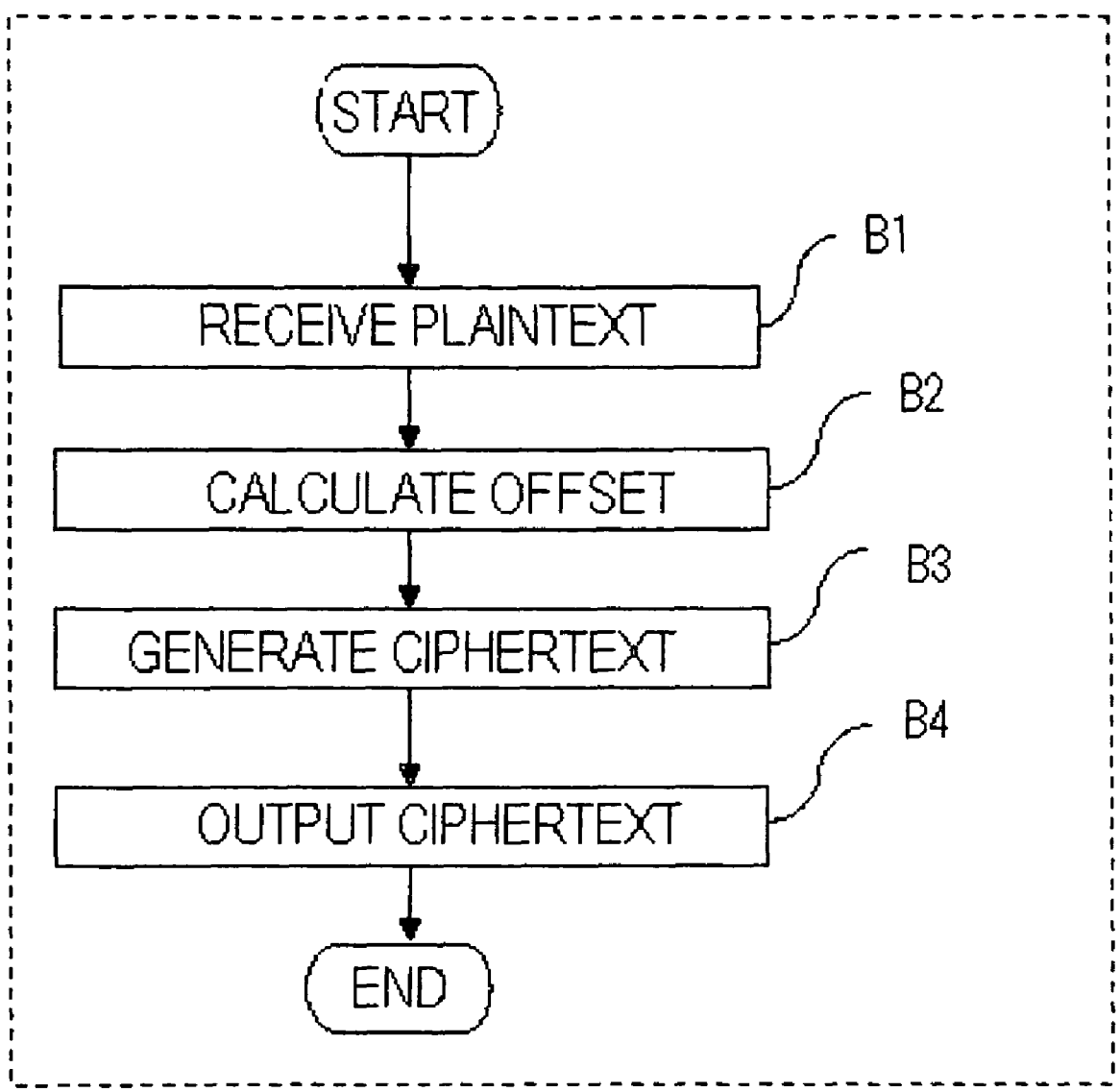
FIG. 6 is a flowchart showing the operation of the second exemplary embodiment of the present invention.
Figure 7:
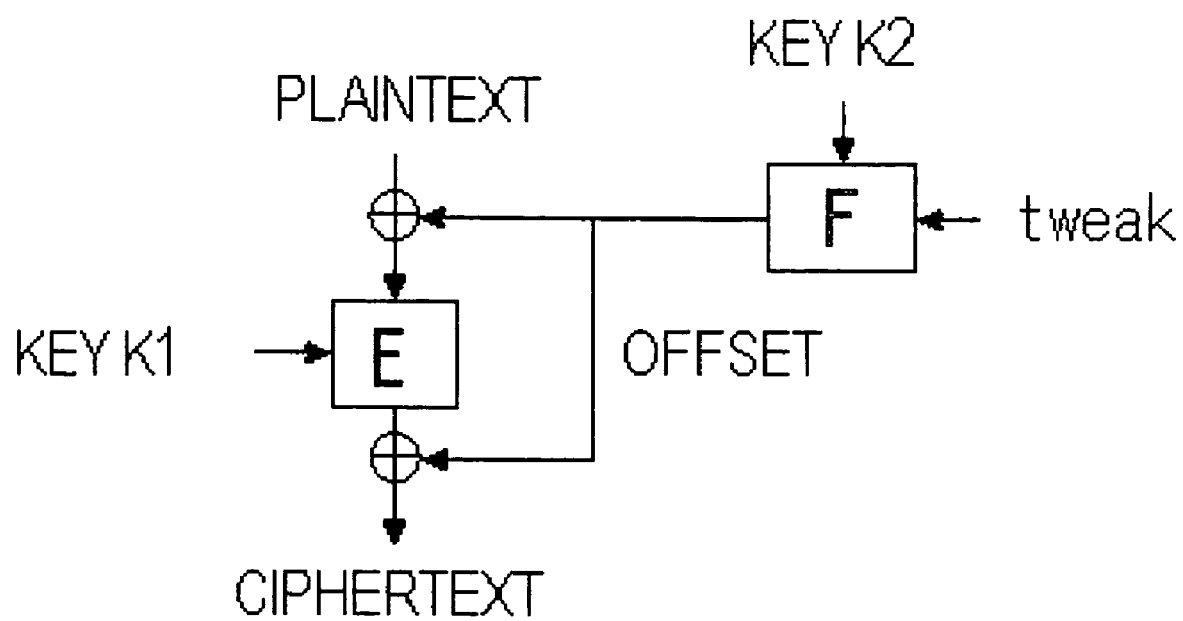
FIG. 7 is a diagram showing the construction of an LRW mode described in Non-Patent Document 1.

First, a plaintext and a tweak are input to the input means 200 (step B1 in FIG. 6), and the offset calculation means 201 uses the tweak to calculate the offset according to expression (1) (step B2 in FIG. 6).

Next, using the offset, which is output by the offset calculation means 201, and the plaintext, the internal encryption means 202 generates a ciphertext (step B3 in FIG. 6).

Finally, the ciphertext is output (step B4 in FIG. 6).

Figure 10:
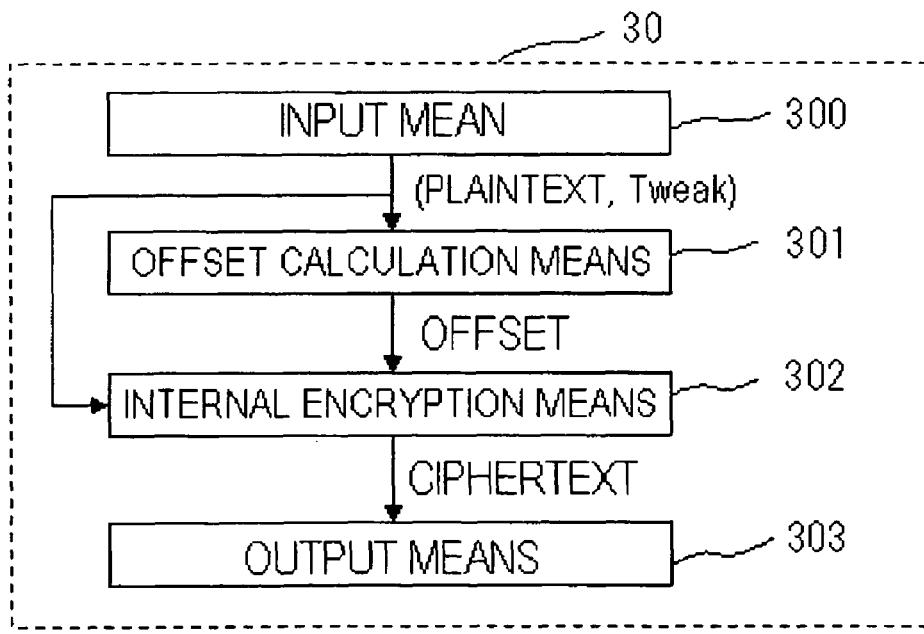
FIG. 10 is a diagram showing the device construction of the third embodiment of the present invention.

Next, a third exemplary embodiment of the present invention will be described. FIG. 10 is a block diagram showing the construction of a tweakable block cipher apparatus in the third exemplary embodiment of the present invention.

Referring to FIG. 10, a tweakable block cipher apparatus 30 in this exemplary embodiment comprises input means 300, offset calculation means 301, internal encryption means 302, and output means 303. As in the first exemplary embodiment shown in FIG. 2, the tweakable block cipher apparatus 30 may be implemented by an information processing device that has a CPU, a memory, and a disk device which are not shown. The means of the tweakable block cipher apparatus 30 can be implemented by storing programs in a storage device or a storage medium and loading the programs into the main storage for running on the CPU.

The input means 300, offset calculation means 301, and output means 303 are the same as the input means 100, offset calculation means 101, and output means 103 in the first exemplary embodiment.

The internal encryption unit 302 is a unit for generating a ciphertext using an offset value, which is output by the offset calculation unit 301, and a plaintext. When the plaintext is M and the offset value output by the offset calculation unit 301 is "offset", the ciphertext output by the internal encryption unit 302 is given by expression (7) shown below.

$$E(K, M+\text{offset})+sel(\text{tweak, offset}) \quad (7)$$

where
E is a block cipher,
K is the key of E, and
+ is an exclusive OR.

sel is a function that outputs either the offset or all zeros according to the value of the tweak. The logic for judging which value will be output by sel is determined in advance. For example, it is possible to determine that the offset is output if the value of the lowest-order bit of the tweak is 0 and that all zeros are output if it is 1.

When the output of sel is all zeros, the calculation of the sum may be omitted because adding all zeros does not change the result.

Figure 11:
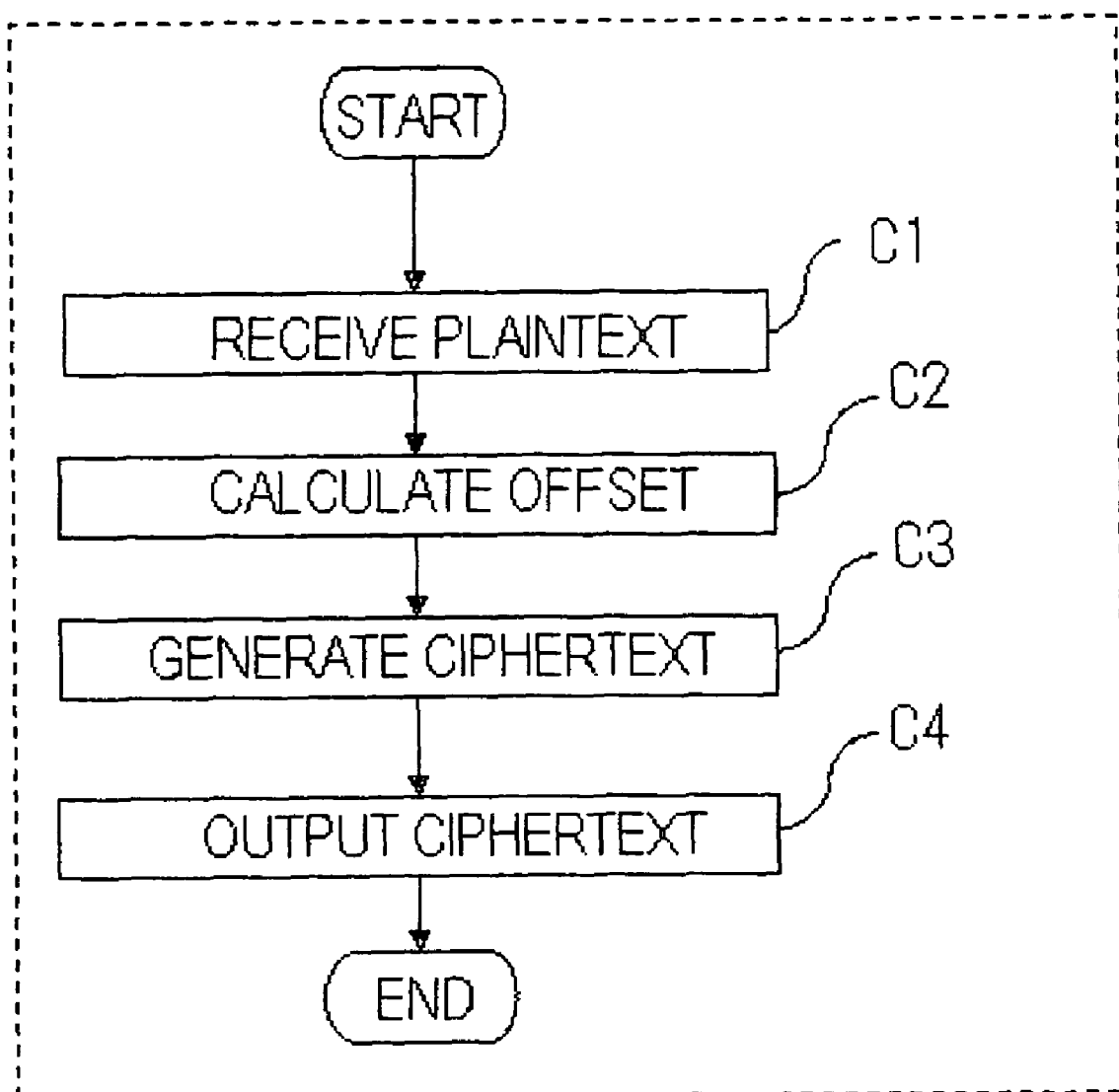
FIG. 11 is a flowchart showing the operation of the third embodiment of the present invention.

The general operation of the third exemplary embodiment of the present invention will now be describe din detail with reference to the flowcharts in FIG. 10 and FIG. 11.

First, a plaintext and a tweak are input to the input means 300 (step C1 in FIG. 11), and the offset calculation means 301 uses the tweak to calculate the offset according to expression (1) (step C2 in FIG. 11).

Next, using the offset, which is output by the offset calculation means 301, the plaintext, and sel(tweak, offset), the internal encryption means 302 generates a ciphertext (step C3 in FIG. 11).

Finally, the ciphertext is output (step C4 in FIG. 11).

The following describes the operation effect of the exemplary embodiments described above.

Because a part of a block cipher is combined with the block cipher itself instead of using the e-AXU function required in the LRW mode, the program size and the construction are smaller than those in the LRW mode in which a generally-known, algebraic e-AXU function is used. The other operations required in the present invention are only very simple functions such as an exclusive OR. Therefore, the exemplary embodiments may substantially be implemented by a block cipher only.

A tweak, which may be updated only in a limited way in the XEX mode, may be updated speedily in any desired way in the exemplary embodiments described above. The reason is that the present invention is configured such that only a part of the block cipher processing is required for updating the tweak and calculating a new offset. The present invention allows a constant plaintext, which must also be encrypted, to be calculated in advance and stored in the memory, thus eliminating the need for the calculation when the tweak is updated.

Figure 8A:
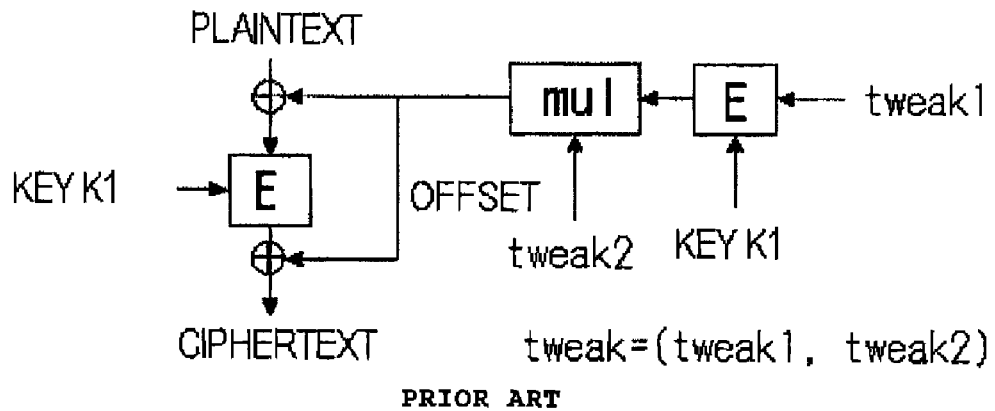
FIGS. 8(A) and 8(B) are diagrams showing the construction of an XEX mode and an XE mode described in Non-Patent Document 3.
Figure 8B:
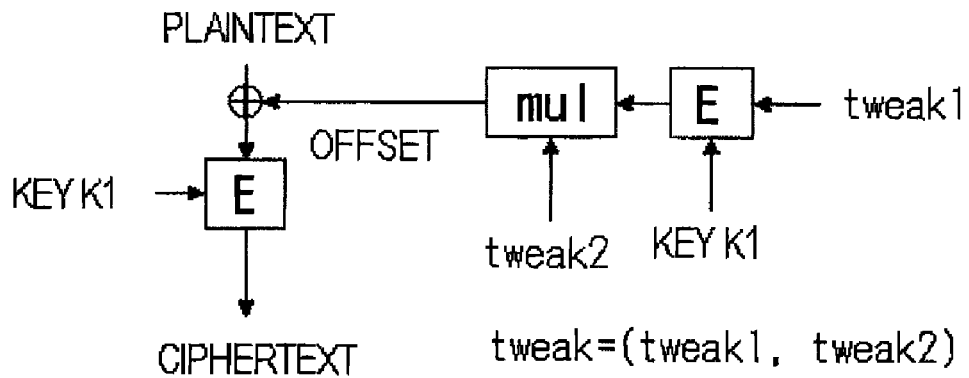

For example, when the block cipher AES described in Non-Patent Document 4 and the four interactions of the AES round function (four rounds of AES) are used, the processing is about 1.4 times faster than in the AES XEX mode (in the version shown in FIG. 8(A) in which tweak2 is fixed and the tweak may be updated in any desired way).

When the present invention is applied to a known block cipher, the theoretical security comparable to that of the conventional mode can be provided depending upon a part of the block cipher that is used.

The reason is that it can be proved that the present invention provides theoretical security when the maximum average of differential probability of a part of the block cipher used in the present invention and some kind of differential probability related to it are sufficiently low.

Note that many of the recently proposed block ciphers are designed to have this property, because a low maximum average of differential probability as a result of several iterations of the round function of a block cipher is thought of as the essential condition for a block cipher that has sufficient security against a differential attack. More specifically, in the case of the four rounds of AES used in the example described above, Non-Patent Document 5 describes that the four rounds of AES has sufficiently low maximum average of differential probability.

The calculation of the other types of differential probability also indicates that the probability is sufficiently small.

So, in case four rounds of AES and AES are combined, it can be proved that the security of the tweakable block cipher of the present invention is ensured by the security of AES.

Even if the present invention is implemented using a structure that is too complex to rigorously prove the maximum value of the differential probability but if it is estimated that the maximum value of the differential probability is sufficiently small, the security can be ensured according to the reliability.

Although the use of four rounds of AES as a part is described in an earlier application (Japanese Patent Application No. 2006-004812; not yet open to public at the application time of the present invention application), the earlier application is intended for an application to a message authentication code and is different from the present invention in both the object and the use.

The present invention is applicable to authentication and encryption in wireless or wired data communications and to data encryption and alteration prevention in storage.

While the present invention has been described with reference to the embodiment above, it is to be understood that the present invention is not limited to the construction of the embodiments above and that modifications and changes that may be made by those skilled in the art within the scope of the present invention are included.

The embodiments and the examples may be changed and adjusted in the scope of all disclosures (including claims) of the present invention and based on the basic technological concept thereof. In the scope of the claims of the present invention, various disclosed elements may be combined and selected in a variety of ways.

The invention claimed is:

1. A tweakable block cipher apparatus comprising:
an input unit that receives a pair of a predetermined fixed plaintext and a tweak;
an offset calculation unit that calculates a sum of a value by encrypting the predetermined fixed plaintext using a block cipher, summing the encrypted predetermined fixed plaintext and the tweak, and encrypting the result of the sum using a partial block cipher to output the encrypted result as an offset;
an internal encryption unit that calculates a sum of the offset and the predetermined fixed plaintext, encrypts the sum using the block cipher, and outputs the encrypted result as a ciphertext; and
an output unit that outputs the ciphertext;
wherein the internal encryption unit calculates a sum of a result, which is generated by encrypting a sum of the offset and the plaintext using the block cipher, and the offset and outputs the sum as a ciphertext.

2. The tweakable block cipher apparatus according to claim 1, wherein the block cipher used by the internal encryption unit and the offset calculation unit is AES, and
the partial block cipher used by the offset calculation unit is an iteration of four rounds of a round function of AES.

3. The tweakable block cipher apparatus according to claim 1, wherein the block cipher and processing using a round function of the block cipher are used.

4. A non-transient computer-readable storage medium storing program that causes a computer to:
  input processing that receives a pair of a predetermined fixed plaintext and a tweak from an input device;
  offset calculation processing that calculates a sum of a value, by encrypting the predetermined fixed plaintext using a block cipher, summing the encrypted predetermined fixed plaintext and the tweak, and encrypting the result of the sum using a partial block cipher to output the encrypted result as an offset using a processor;
  internal encryption processing that calculates a sum of the offset and the predetermined fixed plaintext, encrypts the sum using the block cipher, and outputs the encrypted sum as a ciphertext; and
  output processing that outputs the ciphertext from an output device;
  wherein the internal encryption processing calculates a sum of a result, which is generated by encrypting a sum of the offset and the plaintext using the block cipher, and the offset and outputs the sum as a ciphertext.

5. The non-transient computer-readable storage medium according to claim 4, wherein the block cipher used by the internal encryption processing and the offset calculation processing is AES, and the partial block cipher used by the offset calculation processing is an iteration of four rounds of a round function of AES.

6. The non-transient computer-readable storage medium according to claim 4, wherein the block cipher and processing using a round function of the block cipher are used.

7. A tweakable block cipher method using a computer, the method comprising:
  an input step of receiving a pair of a predetermined fixed plaintext and a tweak from an input device;
  an offset calculation step of calculating a sum of a value, by encrypting the predetermined fixed plaintext using a block cipher, summing the encrypted predetermined fixed plaintext and the tweak and encrypting the result of the sum using a partial block cipher to output an offset;
  an internal encryption step of calculating a sum of the offset and the predetermined fixed plaintext encrypting the sum using the block cipher, and outputting the encrypted sum as a ciphertext; and
  an output step of outputting the ciphertext from an output device;
  wherein a step of encrypting the sum using the block cipher comprises:
  calculating a sum of a result, which is generated by encrypting a sum of the offset and the plaintext using the block cipher and the offset; and
  outputting the sum as a ciphertext.

8. The tweakable block cipher method according to claim 7, wherein the block cipher used in the encryption and the offset calculation is AES, and the partial block cipher used in the offset calculation is an iteration of four rounds of a round function of AES.

9. The tweakable block cipher method according to claim 7, wherein the block cipher and processing using a round function of the block cipher are used.

10. The tweakable block cipher apparatus according to claim 1, wherein the input unit receives the plaintext and a tweak, when a block size is n bits and the tweak is n bits, the offset calculation unit calculates a sum of a value, which is generated by encrypting a constant const using a block cipher E, and the received tweak $$E(K,\text{const})+\text{tweak} \tag{A.1}$$

wherein, in expression (A.1) above,
+ is an exclusive OR,
E is a block cipher of an n-bit block,
K is a key of E, and
const is an n-bit constant having an arbitrary value, and
next, calculates an offset using an n-bit input, n-bit output function G $$G(K_{sub},E(K,\text{const})+\text{tweak}) \tag{A.2}$$

wherein, in expression (A.2) above,
G is a part (partial block cipher) of the block cipher E and is a keyed n-bit function or n-bit substitution that takes a key as a first argument, and an input as a second argument, of G and, when the block cipher E has a construction in which a round function is iterated r times, G iterates the same round function s times where s is an integer less than or equal to r,
keys Ksub and K are independent to each other, lengths thereof are not necessarily the same, and Ksub may be a constant,
E(K,const)+tweak is a calculation result of expression (A.1) above, and
the internal encryption unit calculates a sum of the offset and the plaintext and outputs a sum of a value, generated by encrypting the sum using the block cipher E, and the offset $$E(K,M+\text{offset})+\text{offset} \tag{A.4}$$

where, in expression (A.4) above,
E is a block cipher,
M is the plaintext,
K is a key of E, and
+ is an exclusive OR,
as a ciphertext C.

11. The tweakable block cipher apparatus according to claim 10, wherein the function G satisfies a condition that a maximum average of differential probability G(Ksub,*) shown by expression (A.5) below is below a threshold and values shown by expression (A.6) below and expression (A.7) below are below a threshold, max {Pr(G(Ksub,X)+G(Ksub,X+a)=b)} (A.5) where, in expression (A.5) above, a maximum value(max) is calculated for all non-zero a and all b (including zero), a probability space is defined by the key Ksub and X that is an n-bit uniform random number and, when the key Ksub is fixed to a constant c, is defined only by X $$\max\{Pr(G(K_{sub},X)=b)\} \tag{A.6}$$

$$\max\{Pr(a(K_{sub},X)+X=b)\} \tag{a.7}$$

where, in expression (A.6) above and expression (A.7) above, a maximum value(max) is calculated for all b (including zero), a probability space is defined by the key Ksub and X that is an n-bit uniform random number and, when the key Ksub is fixed to a constant c, is defined only by X.

12. The tweakable block cipher apparatus according to claim 10, wherein the value E(K,const) generated by encrypting the constant const using the block cipher E is stored in a storage device in advance.

* * * * *